United States Patent Office 3,703,596
Patented Nov. 21, 1972

3,703,596
COATING COMPOSITIONS FOR ELECTRODEPOSITION
Matthias Marx, Bad Durkheim, Ernst Becker, Ludwigshafen, and Herbert Spoor, Limburgerhof, Germany, assignors to Badische Anilin- & Soda-Fabrik Aktiengesellschaft, Ludwigshafen (Rhine), Germany
No Drawing. Filed Jan. 19, 1971, Ser. No. 107,852
Int. Cl. C08f 15/40
U.S. Cl. 260—29.6 TA    6 Claims

ABSTRACT OF THE DISCLOSURE

The present invention relates to coating compositions which may be deposited onto cathodes and are thus suitable for electrocoating processes. The compositions comprise copolymers containing polymerized units of (1) at least one nitrogen-basic olefinically unsaturated compound,
(2) 3a,4,5,6,7,7a-hexahydro-4,7-methanoindenyl acrylate-5 or methacrylate-5,
(3) at least one copolymerizable olefinically unsaturated derivative of at least one oxa-alcohol and, if desired,
(4) further copolymerizable olefinically unsaturated monomers, which copolymers are used for electrocoating in aqueous solution or dispersion at least partly in the form of salts of water-soluble acids. The compositions of the invention are suitable for the production of durable coatings on metal parts.

---

The present invention relates to surface coatings which may be electrochemically deposited onto electrically conducting articles that have been made cathodes, followed, if desired, by baking, which coatings are deposited from aqueous solutions or dispersions of copolymers containing nitrogen-basic groups and being present at least partly in the form of their salts.

The production of coatings, in particular those of the baking type, on electrically conducting articles forming a cathode from solutions or dispersions of cationic polymers is known and is described, for example, in U.S. Pat. 3,454,482. Compared with the older process of depositing coatings from solutions or dispersions of anionic polymers onto anodes, the cathodic deposition of coatings has a number of advantages. Thus the latter process does not involve the risk of chemical impairment of the coating due to nascent oxygen forming at the anode as a result of the high deposition potential required. The deposition of coatings onto anodes of base metals such as iron or copper involves the risk of metal ions leaving the anode and passing into solution and, by forming salts, reducing the water-proofness of the coatings or discoloring the coatings, but this risk no longer obtains in the case of cathodic deposition.

In the conventional processes for the production of coatings by cathodic deposition, the coating materials contain reactive groups which enter into cross-linking reactions, especially in the presence of acid catalysts, and which lead to insoluble coatings on baking. Examples of such reactive groups include N-2-oxa-alkylamide, carboxyl or hydroxyl groups, which groups bring about the desired cross-linking reactions in the presence of urea-formaldehyde, melamine-formaldehyde or phenol-formaldehyde resins.

Under the conditions of deposition, however, an alkaline medium is present in the proximity of the cathode, whilst the deposited coating itself is of necessity either neutral or contains basic groups. Thus the conditions are not favorable for the production of cross-linked insoluble coatings when the conventional synthetic cross-linkable coatings are used. Cross-linking is incomplete and takes place only at relatively high baking temperatures.

It is an object of the invention to overcome the above drawbacks and to provide coatings capable of being deposited onto a cathode in electrocoating techniques and which yield, when baked at relatively low temperatures, virtually completely cross-linked, solvent-resistant and corrosion-resistant coatings.

We have found that this object is achieved by coatings capable of deposition onto electrically conducting articles forming a cathode from aqueous solutions or dispersions of copolymers containing nitrogen-basic groups and being present at least partly in the form of salts with organic or inorganic acids, followed, if necessary, by baking, provided that the copolymers having nitrogen-basic groups contain polymerized units of (1) from 3 to 30% by weight of at least one nitrogen-basic olefinically unsaturated compound,
(2) from 5 to 60% by weight of 3a,4,5,6,7,7a-hexahydro-4,7-methanoindenyl acrylate-5 or methacrylate-5,
(3) from 5 to 60% by weight of at least one copolymerizable olefincially unsaturated derivative of at least one oxa-alcohol and
(4) from 0.5 to 50% by weight of at least one further copolymerizable olefinically unsaturated monomer not mentioned under (1) to (3) above, the percentages given under (1) to (4) adding up to 100%.

The following may be said regarding the components of the copolymers to be used in the invention.

(1) The nitrogen-basic copolymerizable compounds which are contained as polymerized units in the copolymer in an amount of from 3 to 30% by weight, preferably from 5 to 20% by weight, include unsubstituted or alkyl-substituted vinyl imidazoles, C-vinyl pyridines, aminoalkylamides of acrylic and/or methacrylic acid, in particular N-(dialkylaminoalkyl) acrylamides containing alkyl groups of from 1 to 4 carbon atoms, N-(dialkylaminoalkyl) methacrylamides containing alkyl groups of from 1 to 4 carbon atoms, such as N-($\beta$-dimethylaminoethyl) acrylamide or N-($\beta$-diethylaminoethyl) methacrylamide, and aminoalkyl esters of polymerizable acids, in particular dialkylaminoalkyl acrylates or methacrylates containing alkyl groups of from 1 to 4 carbon atoms, such as N,N-dimethylaminoethyl acrylate or N,N-diethylaminoethyl methacrylate, dialkanolaminoalkyl acrylates or methacrylates or alkanolalkylaminoalkyl acrylates or methacrylates each containing alkyl groups of from 1 to 4 carbon atoms and alkanol groups of from 2 to 3 carbon atoms, such as N,N-diethanolaminoethyl acrylate and N,N-ethanolethylaminoethyl acrylate.

(2) The acrylic or methacrylic ester of 3a,4,5,6,7,7a-hexahydro-4,7-methano-indenyl alcohol-5, which is contained in the copolymers according to the present invention in an amount of from 5 to 60% by weight, preferably from 10 to 40% by weight, may be obtained, for example, in a simple manner by esterification of the alcohol with acrylic or methacrylic acid in the presence of acid catalysts such as sulfuric acid or acid ion exchangers with removal of the water formed.

(3) Suitable copolymerizable monoolefinically unsaturated derivatives of oxa-alcohols are their allyl or vinyl ethers and, in particular, their esters with copolymerizable olefinically unsaturated carboxylic acids of from 3 to 5 carbon atoms, especially monocarboxylic acids such as acrylic acid or methacrylic acid. Suitable oxa-alcohols include, in particular, those having from 1 to 30 ether groups and a total of from 3 to 100 carbon atoms, e.g. derivatives or polyadducts of ethylene oxide or propylene oxide, such as the monomethyl, monoethyl, monopropyl or monobutyl ethers of ethylene glycol, diethylene glycol, triethylene glycol, tetraethylene, glycol or the corresponding propylene glycols. These copolymerizable oxa-alcohol derivaties are present as polymerized units in the copolymer in a proportion of from 5 to 60% by weight, preferably from 15 to 50% by weight.

(4) Examples of suitable further copolymerizable monoolefinically unsaturated monomers are (alkyl)vinyl benzenes, in particular styrene, α-, o-, m- and p-alkylstyrenes, esters of (meth)acrylic acid with straight-chain or branched-chain alcohols of from 1 to 8 carbon atoms, such as, in particular, the ethyl, n-propyl, isopropyl, n-butyl, isobutyl, t-butyl and 2-ethylhexyl acrylates and methyl methacrylate. Other suitable monomers of this class are, in particular, monohydroxy-($C_2$ to $C_6$ alkyl) esters of acrylic acid or methacrylic acid such as the 2-hydroxyethyl, 2-hydroxypropyl or 4-hydroxybutyl ester, and also, for example, vinyl esters of $C_1$ to $C_5$ alkanoic acids and the nitrile or acrylic acid or methacrylic acid. Component (4) may be persent in the copolymer of the invention in the form of polymerized units in an amount of 0 to 50% by weight, preferably from 0.5 to 50% and more preferably from 5 to 45% by weight. The copolymers may be prepared by conventional techniques.

We have found it advantageous to prepare the copolymers by solution polymerization in organic solvents, which may, if desired, contain small amounts (up to 10% by weight) of water. Suitable solvents for this purpose are organic solvents or solvent mixtures having a solubility in water of at least 30 g./l. When preparing the aqueous solutions or dispersions of the film-forming agents usually no removal or only partial removal (for example by distillation) of the said solevnts from the mixtures is necessary. Examples of suitable solvents are methanol, ethanol, propanols, (iso)butanol, acetone, dioxane and tetrahydrofuran. Examples of solvent mixtures are butanol/xylene, propanol/toluene and dioxane/amyl acetate.

Suitable polymerization methods are described, for example, in 'Methoden der organischen Chemie" (Houben-Weyl), Vol. XIV/1, pp. 1044-1047 and pp. 774-782, Stuttgart, 1961.

The preparation of the salts of the copolymers may also be carried out by the usual techniques such as reacting the copolymers with acids or with substances which react as acids. Alternatively, the acid component may be contacted with the copolymer-forming components before or during copolymerization. Suitable neutralizing agents are inorganic acids or organic acids such as acetic acid, maleic acid or formic acid. The preparation of the aqueous solutions or aqueous dispersions of the salts of the copolymers may also be carried out by conventional methods. One suitable method, for example, is to prepare dispersions from solutions of the copolymers in organic solvents by introducing water and then to add the acid component. Alternatively, water may be kneaded into the salts of the copolymers or organic solutions of the salts may be diluted with water. In general, it is advantageous to adjust the pH of the solutions or dispersions to from 2 to 8, preferably from 3 to 6. This is usually the case when from 0.2 to 1. acid equivalents are introduced per base equivalent in the polymer. Finally, it is also convenient to adjust the solids content of the solutions or dispersions, in use, to from 3 to 20% by weight.

The aqueous solutions or dispersions of the polymeric salts may contain additional water-soluble or water-dispersible binders which, when added to the said salts, are capable of cataphoretic deposition, and other auxiliaries.

Examples of suitable binders of this type include amino resins, phenolic resins, epoxy resins, appropriately modified alkyd resins or mixtures thereof. The weight of added binder should not usually be greater than the weight of the copolymer salts.

Said other auxiliaries may include, for example, conventional pigments, curing catalysts (in particular heavy metal compounds in small quantities) and flow improvers.

Coatings are produced from the aqueous solutions or dispersions by electrodeposition onto electrically conducting articles immersed in the said solution or dispersion and made the cathodes in electrical circuits. This stage may be followed by baking, if necessary. It is usually advantageous when no ions pass from the anode into the coating solutions or dispersions and it is thus convenient to use anodes which undergo no change under the operating conditions or to separate off the anode chamber by a diaphragm.

The cathodic deposition of the coatings may take place using a D.C. potential, if necessary a plusating D.C. potential, of from 2 to 600 volts, preferably from 10 to 150 volts. The temperature may be from 10 to 80° C., preferably from 20 to 45° C. The duration of the coating operation is generally from about 0.5 to 3 minutes. The coated articles are then rinsed in water and dried at from 80 to 250° C., preferably from 100 to 150° C., for a period of from 20 to 60 minutes, during which time cross-linking of thec oatings takes place. Cross-linking may be further accelerated by the presence of a heavy metal catalyst.

The present process is particularly suitable for the production of baked coatings forming base coats or single-layer coats on metal such as bonderized or non-bonderized sheet iron, copper or copper alloys.

The process is also applicable to the production of coatings on non-metallic articles which have been provided with an electrically conducting surface, such as metallized plastics, graphitized textile materials or varnish films pigmented with conducting carbon black.

The cathodically deposited coatings of the invention are particularly noteworthy for their excellent resistance to solvents and corrosion.

In the following examples the parts are by weight.

EXAMPLE 1

72 parts of a copolymer of 30 parts of 3a,4,5,6,7,7a-hexahydro-4,7-methano-indenyl-acrylate-5, 30 parts of ethyl-diethyleneglycol acrylate, 10 parts of diethyl-β-aminoethyl acrylate, 25 parts of methyl acrylate and 5 parts of styrene forming an 88.5% solution in isopropanol are neutralized with 5 parts of acetic acid and diluted with a mixture of 31 parts of n-propanol and 492 parts of water. 30 parts of titanium dioxide pigment (Rutile RN 58) are added and the mixture is homogenized in a ball mill for 24 hours.

The resulting dispersion is subjected to a D.C. potential of 40 volts for deposition onto a piece of deep-drawn sheet iron forming the cathode. After coating, the sample is rinsed in water and then baked for 30 minutes at 150° C. A white glossy coating is obtained. The coating is scratched with a pointed instrument in two directions so as to form a cross thereon and expose bare metal; the sample is then placed in distilled water. After 1000 hours underrusting of the metal is found to have proceeded less than 1 mm. from the point of intersection of the cross.

The coatings, when subjected to a salt spray test according to ASTM B 117-64, are also found to show less than 1 mm. of underrusting after 450 hours testing time, and they also show excellent resistance to solvents such as aliphatic and aromatic hydrocarbons.

EXAMPLE 2

Under the conditions stated in Example 1, a copolymer is formed in isopropanol from 15 parts of 3a,4,5,6,7,7a-hexahydro-4,7-methano-indenyl-acrylate-5, 40 parts of n-butyltriethyleneglycol methacrylate, 5 parts of N-(β-dimethylamino-ethyl)-acrylamide, 30 parts of n-butyl acrylate and 10 parts of styrene, and the copolymer is neutralized with acetic acid and diluted with the mixture of n-propanol and demineralized water as used in Example 1. Pigmenting, electrocoating and baking are carried out as described in Example 1. There is thus obtained an even coating having high resistance to corrosion and solvents.

We claim:

1. A coating composition capable of electrodeposition onto an electrically conducting article forming the cathode from an aqueous solution or dispersion of a film-forming copolymer containing nitrogen-basic groups and present at least partly in the form of a salt with an organic or inorganic acid, said salt being formed by introducing from 0.2 to 1.5 acid equivalents per base equivalent of said copolymer, said copolymer containing polymerized units of
   (1) from 3 to 30% by weight of at least one nitrogen-basic monoolefinically unsaturated compound, selected from the group consisting of vinyl imidazole, vinyl pyridine, N-(dialkylaminoalkyl) acrylamides containing $C_1$ to $C_4$ alkyl groups, N-(dialkylaminoalkyl) methacrylamides containing $C_1$ to $C_4$ alkyl groups, dialkylaminoalkyl acrylates or methacrylates containing $C_1$ to $C_4$ alkyl groups, (dialkanolamino) alkyl acrylates or methacrylates and (alkylalkanolamino) alkyl acrylates or methacrylates all containing $C_1$ to $C_4$ alkyl groups and $C_2$ to $C_3$ alkanol groups,
   (2) from 5 to 60% by weight of 3a,4,5,6,7,7a-hexahydro-4,7-methanoindenyl-(acrylate-5 or methacrylate-5),
   (3) from 5 to 60% by weight of at least one copolymerizable monoolefinically unsaturated derivative of at least one oxa-alcohol selected from the group consisting of vinylether of an oxa-alcohol, allylether of an oxa-alcohol and esters of copolymerizable olefinically unsaturated carboxylic acids of from 3 to 5 carbon atoms with an oxa-alcohol, said oxa-alcohols having 1 to 30 ether groups and a total of from 3 to 100 carbon atoms, and
   (4) from 0 to 50% by weight of at least one further copolymerizable monoolefinically unsaturated monomer not mentioned under (1) to (3) above, the percentages given under (1) to (4) adding up to 100%.

2. A coating composition as claimed in claim 1 wherein the copolymer contains polymerized units of
   from 5 to 20% by weight of component (1),
   from 10 to 40% by weight of component (2),
   from 15 to 50% by weight of component (3) and
   from 0.5 to 50% by weight of component (4), the percentages given under (1) to (4) adding up to 100%.

3. A coating composition as claimed in claim 1 wherein the copolymer contains, as component (3) polymerized units of an ester of acrylic or methacrylic acid with an oxa-alcohol.

4. A coating composition as claimed in claim 1 wherein the copolymer contains, as component (4), polymerized units of at least one compound selected from the group consisting of styrene, an ester of acrylic acid or methacrylic acid with alcohols of from 1 to 8 carbon atoms, a monohydroxy-($C_2$ to $C_6$ alkyl) ester of acrylic or methacrylic acid, a vinyl ester of an alkanoic acid of from 1 to 5 carbon atoms, acrylonitrile and methacrylonitrile.

5. A coating composition as claimed in claim 1 wherein said aqueous solution or dispersion has a pH of 2 to 8.

6. A coating composition as claimed in claim 1 wherein said aqueous solution or dispersion has a pH of 3 to 6.

References Cited

UNITED STATES PATENTS 3,454,482   7/1969   Spoor et al. _____ 204—181

JAMES A. SEIDLECK, Primary Examiner
S. M. LEVIN, Assistant Examiner

U.S. Cl. X.R.
117—128.4, 138.8 A; 260—78.5 R, 80.72

PO-1050
(5/69)

UNITED STATES PATENT OFFICE
CERTIFICATE OF CORRECTION

Patent No. 3,703,596          Dated November 21, 1972

Inventor(s) Matthias Marx, Ernst Becker, and Herbert Spoor

It is certified that error appears in the above-identified patent and that said Letters Patent are hereby corrected as shown below:

Column 1, line 8, insert -- Claims priority, application Germany, January 22, 1970, P 20 02 756.9 --.

Column 2, line 72, "tetraethylene, glycol" should read -- tetraethylene glycol --.

Column 3, line 2, "derivaties" should read -- derivatives --; line 18, "persent" should read -- present --; line 31, "solevnts" should read -- solvents --; line 59, "0.2 to 1." should read -- 0.2 to 1.5 --.

Column 4, line 11, "plusating" should read -- pulsating --; line 19, "thec oatings" should read -- the coatings --.

Signed and sealed this 26th day of February 1974.

(SEAL)
Attest:

EDWARD M. FLETCHER, JR.
Attesting Officer

C. MARSHALL DANN
Commissioner of Patents